United States Patent [19]
Kofsky

[11] 3,713,151
[45] Jan. 23, 1973

[54] LIGHTWEIGHT DOPPLER NAVIGATOR

[75] Inventor: Harvey Kofsky, Montreal, Quebec, Canada

[73] Assignee: Canadian Marconi Company, Montreal, Quebec, Calif.

[22] Filed: Oct. 12, 1970

[21] Appl. No.: 79,993

[30] Foreign Application Priority Data

Oct. 14, 1969 Canada..................64,864

[52] U.S. Cl..................343/7.5, 343/7 A, 343/8, 343/9
[51] Int. Cl................G01s 9/02
[58] Field of Search..........343/8, 9, 7 A, 7.5

[56] References Cited

UNITED STATES PATENTS 2,896,205  7/1959  Berger..................343/8 X

Primary Examiner—T. H. Tubbesing
Attorney—Fetherstonhaugh & Co.

[57] ABSTRACT

An FM/CW Doppler Aircraft Navigation system which detects Doppler shift frequencies associated with Altitude holes to compute aircraft flight parameters. A transmitter is modulated at one frequency and the Doppler shift associated with the $n$th order altitude hole is detected. The modulating frequency is then changed and Doppler shifts associated with the $n$th and $(n + 1)$th order altitude holes of the second modulating frequency are detected. The above data supplies enough information to compute aircraft velocity and altitude. In a further embodiment the $n$th order altitude hole at zero Doppler frequency, is also detected, whereby it is possible to compute ground slope in addition to aircraft parameters.

6 Claims, 10 Drawing Figures

INVENTOR
H. KOFSKY

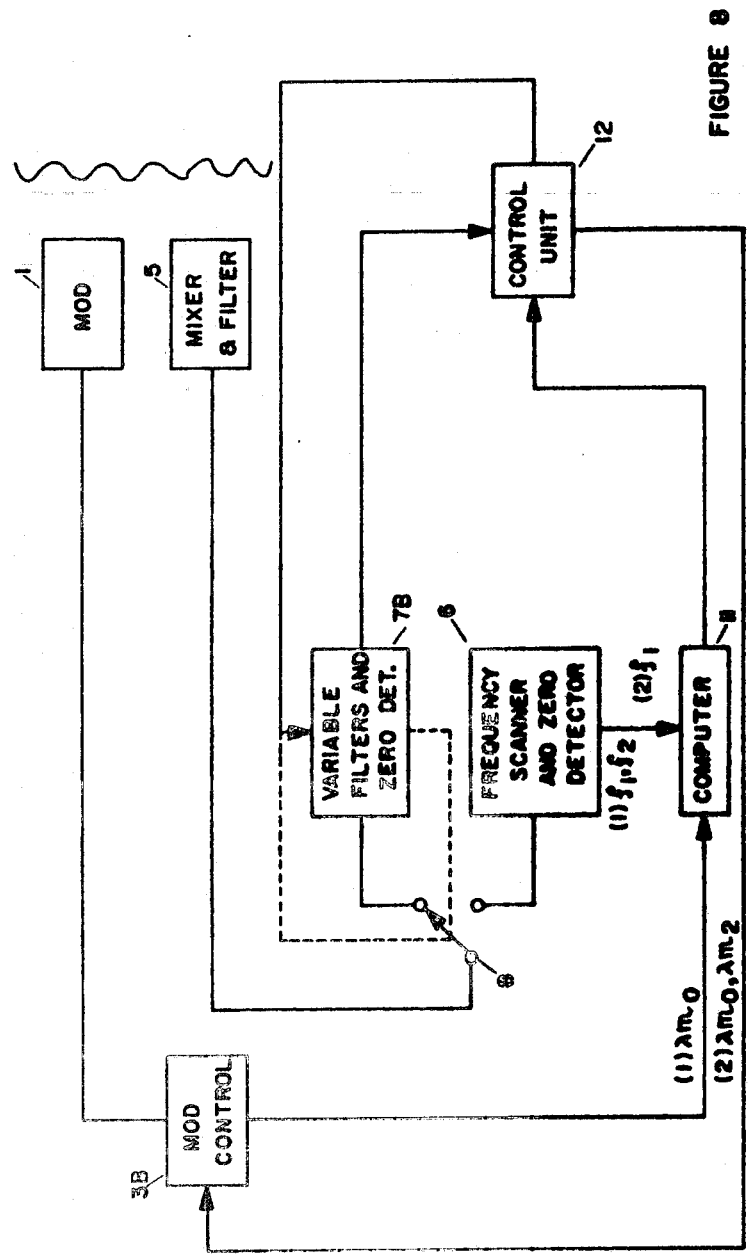

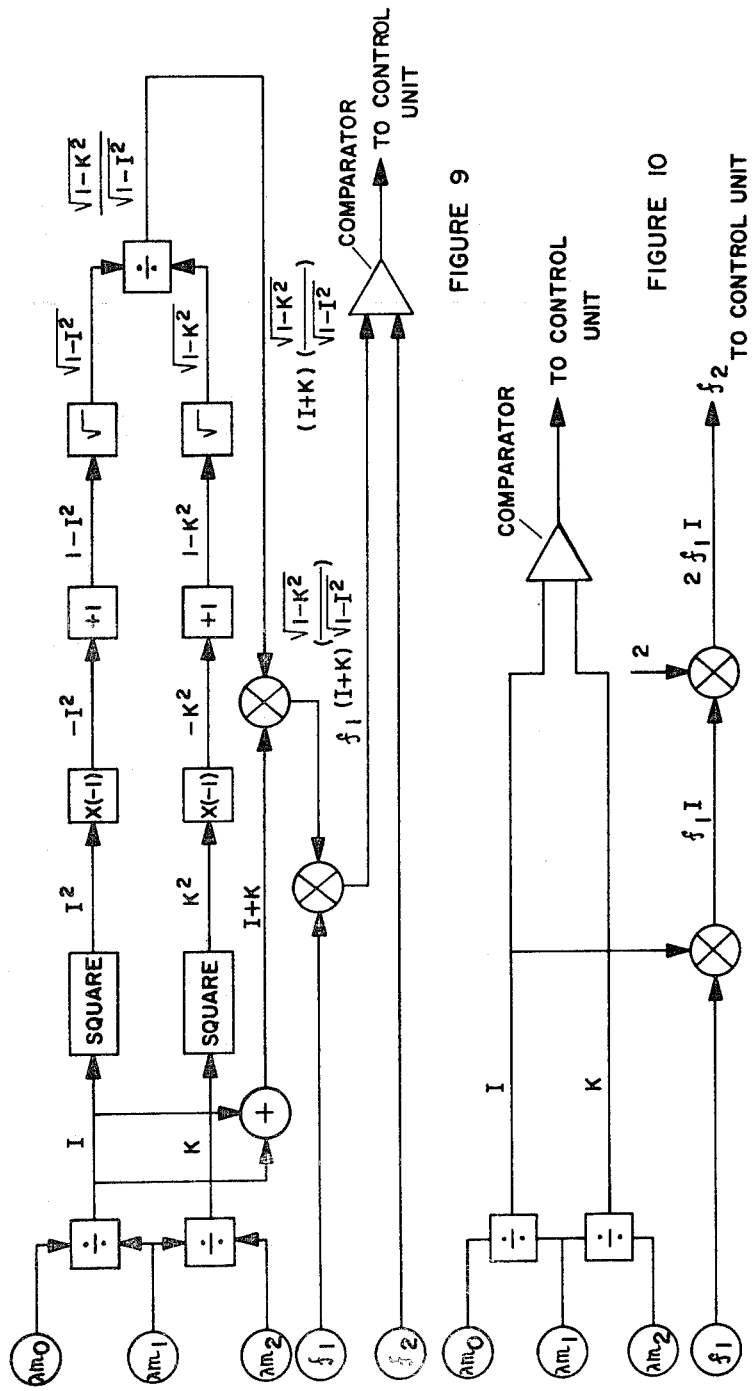

LIGHTWEIGHT DOPPLER NAVIGATOR

This invention relates to a method for measuring aircraft flight parameters employing FM/CW Doppler techniques. More specifically, this invention relates to a method of measuring the above parameters by detecting Doppler shift frequencies associated with altitude holes and using the information thus gathered to compute the parameters.

In present FM/CW Doppler systems, the presence of altitude holes is undesirable and many methods have been devised to eliminate the effect of altitude holes. However, applicant has discovered that the presence of these altitude holes can be advantageously employed to provide a lightweight and inexpensive aircraft flight parameter measuring system.

The Doppler effect is a well known phenomenon by means of which the frequency transmitted from a moving craft is shifted in proportion to the velocity of the craft. The instant invention utilizes the Doppler effect by detecting the Doppler shift frequencies at which altitude holes occur. Another well known phenomenon utilized in the instant invention is the fact that, in an FM/CW system, altitude holes appear at multiples of the half wavelengths of the modulating frequency.

Figure 3:
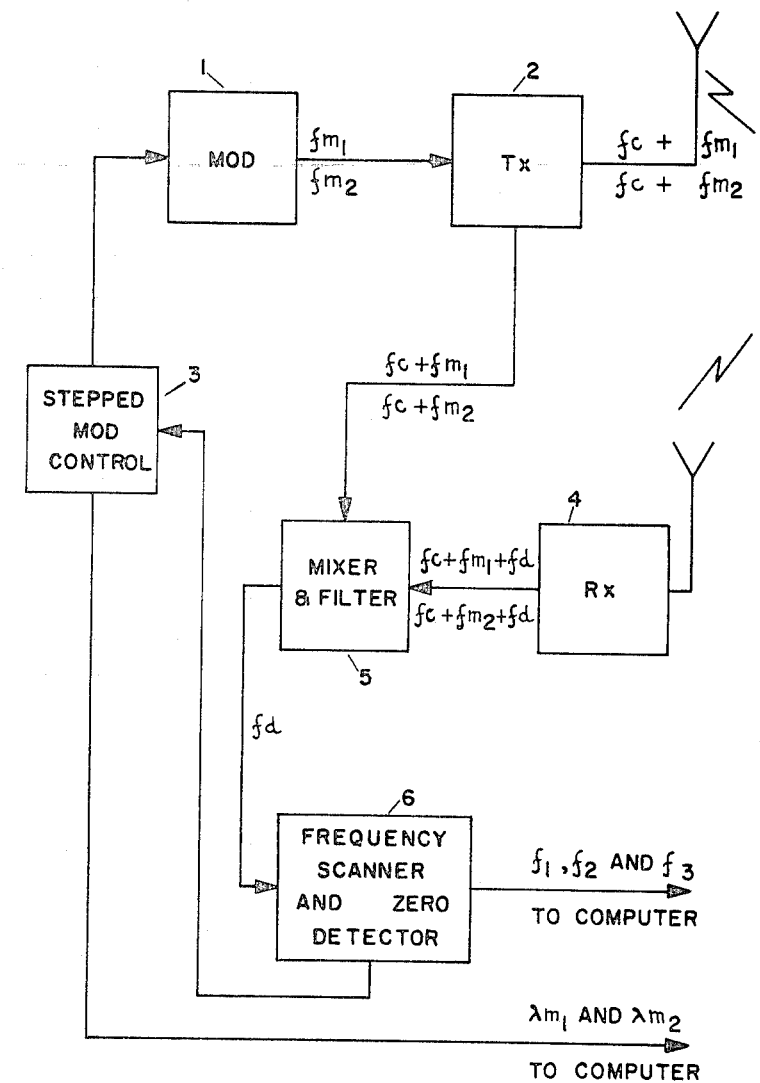
Figure 4:
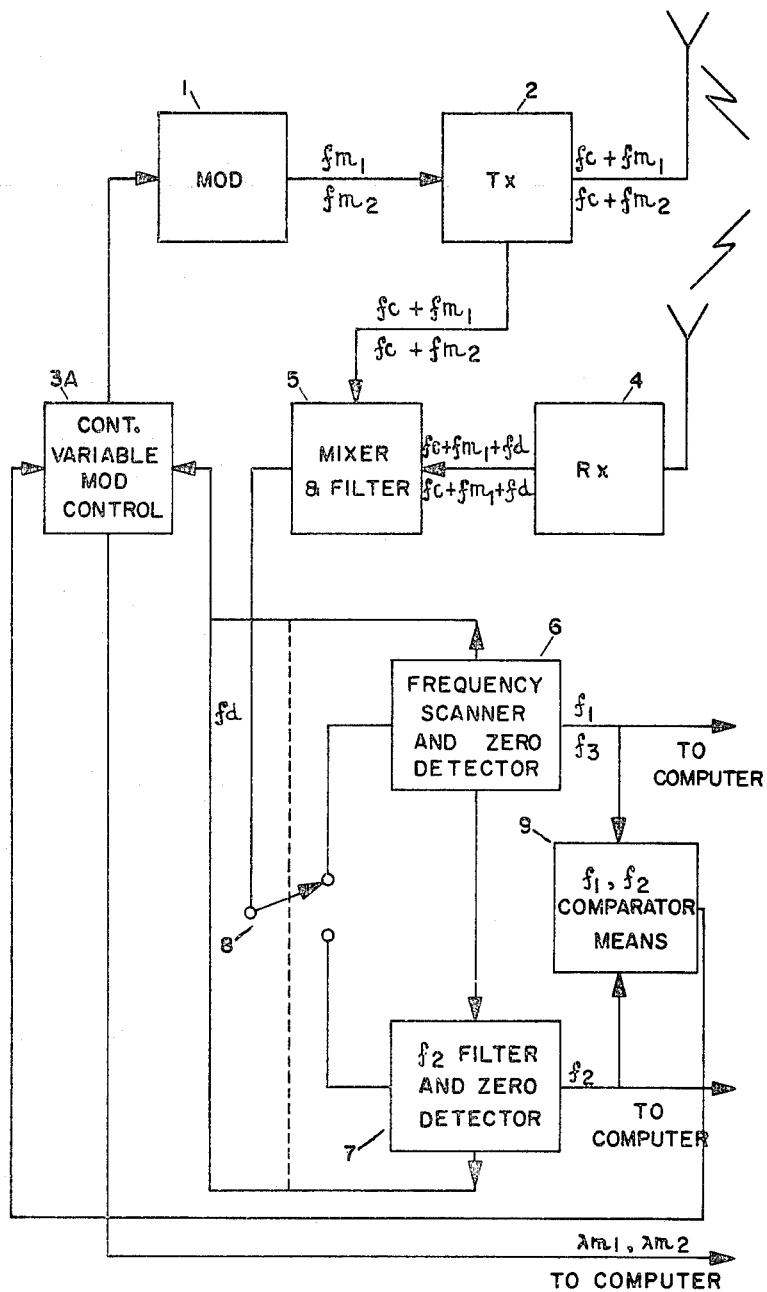

The invention will be described below together with the accompanying drawings in which:

FIGS. 1, 1(a), 2 and 7 are illustrations used in explaining the theory behind the invention;

FIGS. 3, 4 and 8 illustrate, in schematic form, three embodiments of the invention; and FIGS. 5, 6, 9 and 10 illustrate, in schematic form, computing circuits in accordance with the invention.

Figure 1:
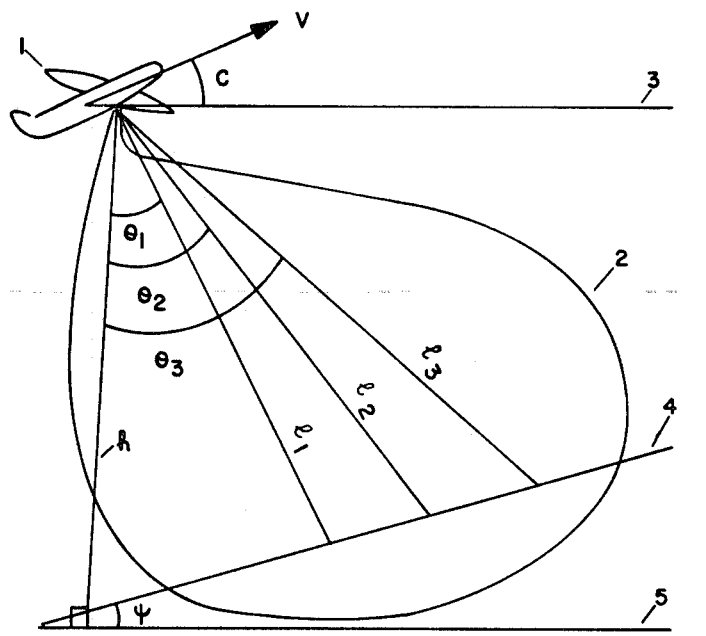

In FIG. 1, 1 is an aircraft using an antenna having a fan shaped beam 2 of narrow width and transmitting a signal at a carrier frequency $f_c$, frequency modulated by a signal having a wavelength $\lambda$. The aircraft is flying with velocity V at some angle c to the horizontal 3. The ground 4 is sloping at an angle $\psi$ to the horizontal 5. $l_1$ to $l_3$ are lines whose lengths are successive multiples of $\lambda/2$ and $\theta_1$ to $\theta_3$ are the angles between the vertical $h$ and the lines $l_1$ to $l_3$.

Figure 1A:
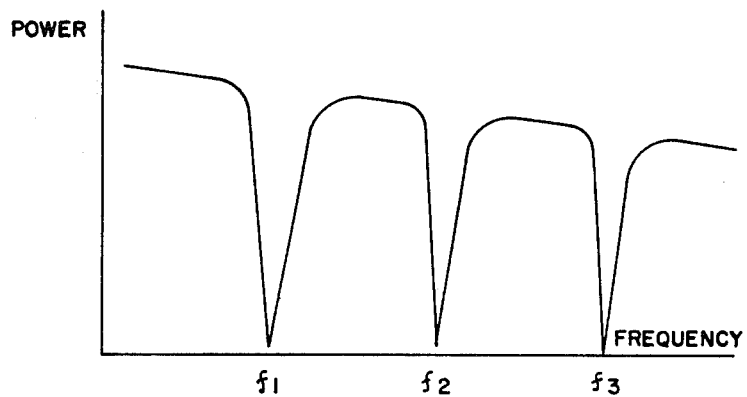

FIG. 1(a) illustrates the response of the system (the drop in power is due to an increase in distance) and $f_1$ to $f_3$ are the Doppler shift frequencies associated with the altitude holes $l_1$ to $l_3$ respectively. As is apparent, these frequencies can be detected by scanning the appropriate frequency band and noting these frequencies at which there is an abrupt drop in power.

The following identities define the system illustrated in FIG. 1:

$$F = \frac{f_1}{\sin(\theta_1 - c)} = \frac{f_2}{\sin(\theta_2 - c)} = \frac{f_3}{\sin(\theta_3 - c)} \quad (1)$$

$$h\cos\psi = l_1\cos(\theta_1 - \psi) = l_2\cos(\theta_2 - \psi) = l_3\cos(\theta_3 - \Psi) \quad (2)$$

$$\lambda/2 = l_1/n = l_2/n+1 = l_3/n+2 \quad (3)$$

where $F$ = Doppler shift due to forward velocity $V = (2V/\lambda_c)$
$n$ = order of altitude hole of $l$.

Although it may be possible to solve these equations by detecting several altitude holes and using iterative procedures, applicant has discovered that a simpler solution, and a solution amenable to inexpensive computing mechanisms can be obtained by detecting the Doppler shift frequency associated with an $n$th order altitude hole of one modulating frequency, and then changing the modulating frequency and detecting the Doppler shift frequency associated with the nth order altitude hole of the second modulating frequency. Alternatively a second Doppler shift frequency can be selected, and the modulating frequency varied until a hole appears at this second Doppler shift frequency.

Figure 2:
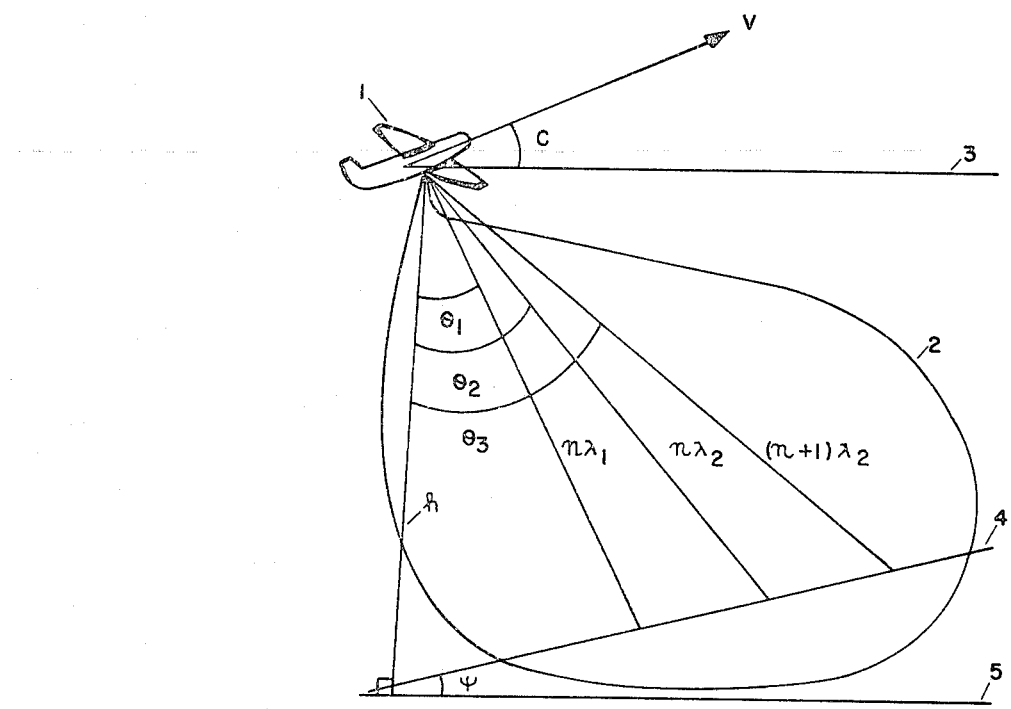
Figure 7:
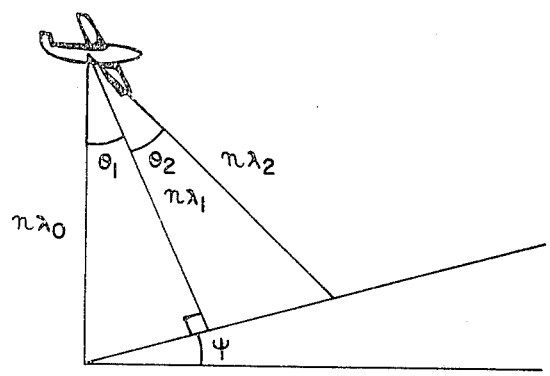

Referring now to FIG. 2, in which reference numerals identical to those in FIG. 1 represent the same things, $n\lambda_1$ is the nth order altitude hole of modulating frequency $f_{m1}$, i.e., the nth multiple of $\lambda_{m1}/2$. $n\lambda_2$ is the nth order altitude hole of modulating frequency $f_{m2}$ and $(n+1)_2$ is the $(n+1)$th order altitude hole of the modulating frequency $f_{m2}$. One embodiment of the invention assumes that the elevation angle $c$ of the aircraft and the ground slope $\psi$ are negligible and can therefore be neglected. Thus, the $c$ and $\psi$ terms disappear from equations (1) to (3) above. In addition the terms $l_1$, $l_2$ and $l_3$ are replaced by $n\lambda_1$, $n\lambda_2$ and $(n+1)\lambda_2$ respectively, and the terms $f_1$, $f_2$ and $f_3$ are the Doppler shift frequencies associated with the altitude holes $n\lambda_1$, $n\lambda_2$ and $(n+1)\lambda_2$ respectively.

If we now let $K = f_1/f_2$ and $L = n\lambda_2/n\lambda_1 = 2n\lambda_{m2}/2n\lambda_{m1}$
$= \lambda_{m2}/\lambda_{m1} = f_{m1}/f_{m2}$
then $\cos\theta_1 = L\cos\theta_2$
and $\sin\theta_1 = \sqrt{1-\cos^2\theta_1} = \sqrt{1-L^2\cos^2\theta_2}$
from equation (1), $f_1\sin\theta_2 = f_2\sin\theta_1$
thus $f_1\sin\theta_2 = f_2\sqrt{1-L^2\cos^2\theta_2}$
Squaring both sides of the above equation we get
$f_1^2\sin^2\theta_2 = f_2^2(1-L^2\cos^2\theta_2)$
substituting $\sin^2\theta_2 = 1 - \cos^2\theta_2$ in the above
$f_1^2 - f_1^2\cos^2\theta_2 = f_2^2 - f_2^2L^2\cos^2\theta_2$
$\cos^2\theta_2 = (f_2^2 - f_1^2)/(L^2f_2^2 - f_1^2)$ $$\therefore \sin\theta_2 = \sqrt{1 - \frac{f_2^2 - f_1^2}{L^2f_2^2 - f_1^2}}$$

from equation (1), $F = f_2/\sin\theta_2$ $$\therefore F = \frac{f_2}{\sqrt{1 - \frac{f_2^2 - f_1^2}{L^2f_2^2 - f_1^2}}}$$

Rearranging terms $$F = f_2\sqrt{\frac{L^2f_2^2 - f_1^2}{L^2f_2^2 - f_1^2}}$$

$$= f_2\sqrt{\frac{1 - f_1^2/L^2f_2^2}{1 - 1/L^2}}$$

$$\therefore F = f_2\sqrt{\frac{1 - K^2/L^2}{1 - 1/L^2}}$$

Define a term $\sin\phi = 1/L$ $$\therefore F = f_2\sqrt{\frac{1 - K^2\sin^2\phi}{1 - \sin^2\phi}}$$

$$= \frac{f_2}{\cos\phi}\sqrt{1 - K^2\sin^2\phi}$$

and $$F^{-1} = \frac{\cos\phi}{f_2\sqrt{1 - K^2\sin^2\phi}}$$

Integrating both sides of the above equation, $$\int F^{-1} = \int \frac{\cos\phi}{f_2\sqrt{1 - K^2\sin^2\phi}}$$

$$= \frac{1}{f_2}\frac{\sin^{-1}(\sin\phi)}{K}$$

thus $Kf_2\int F^{-1} = \sin^{-1}(K\sin\phi)$
$\sin(Kf_2\int F^{-1}) = K\sin\phi$
$\sin(f_1\int F^{-1}) = K/L$ \quad (4)

It can be seen that, in equation (4), once $f_1$, $f_2$, $\lambda_{m1}$ and $\lambda_{m2}$ are known, the only unknown quantity is $F$. Thus, if a computing mechanism is provided which will solve equation (4), and this mechanism is provided with the quantities $f_1, f_2, \lambda_{m1}$ and $\lambda_{m2}$ the quantity $F$, and thereby the velocity $V$ can be determined.

FIGS. 3 and 4 illustrate, in schematic form, systems for obtaining the quantities $f_1, f_2, \lambda_{m1}$ and $\lambda_{m2}$. The various circuits which constitute the "black boxes" are well known in the art and therefore are not a part of the invention, nor do they require further explanation.

Referring now to FIG. 3, 1 is a modulator which modulates transmitter 2 and is controlled by stepped modulator control 3. A delayed echo return is received by receiver 4. Mixer and filter 5 is fed at one input from receiver 4 and at the other input, with an undelayed signal, from transmitter 2. The filter of 5 has a pass band equal to the frequency band, $f_d$, having the characteristics illustrated in FIG. 2. The frequency band $f_d$ is scanned by frequency scanner and zero detector 6 which detects the first Doppler frequency displaying an abrupt drop in amplitude. The scanner may be programmed to scan from DC up, or to scan only a predetermined frequency band. When a drop in amplitude (hereinafter referred to as a zero) is detected, the Doppler frequency at which it occurred is fed to the computer. This frequency is $f_1$.

The wavelength of modulating frequency at which $f_1$ occurred is $\lambda_{m1}$ and this value is fed from the stepped modulator control to the computer as illustrated.

When the zero is detected in 6, a signal is sent to the modulator control which causes it to alter the modulating frequency to $fm_2$ such that $\lambda_{m2}/\lambda_{m1}$ is equal to some fixed constant $L$ It is cautioned that $L$ must be so selected that, when $\lambda_{m2}$ is used, the Doppler shift frequency closest to $f_1$ at which a zero occurs is representative of the same order of altitude hole as was detected by $f_1$. When this precaution is taken, it is no longer necessary to solve for $n$, so that the solution of the foregoing equations is greatly simplified. If $L$ is not correctly chosen, i.e., $\lambda_{m2}$ is too far removed from $\lambda_{m1}$, then the Doppler shift frequency closest to $f_1$ at which an altitude hole occurs when $\lambda_{m2}$ is used could be representative of a lower or higher order hole. The correct value of $L$ can readily be precalculated for different values of modulating frequency and aircraft speed, and the stepped modulator can be further controlled with aircraft velocity outputs to provide a suitable value $L$ As is well known in the art, if $\lambda_{m2}$ is greater than $\lambda_{m1}$, then the Doppler frequency at which the same altitude hole appears, $f_2$, will be greater than and immediately adjacent to $f_1$, when $L$ has been properly chosen. If $\lambda_{m2}$ is less than $\lambda_{m1}$, then of course the opposite is true. Thus, if $L$ is chosen greater than 1, the frequency scanner will be programmed to start scanning at $f_1$ and continue upward in frequency when the first zero has been detected and the modulating frequency has been changed. If $L$ is chosen less than 1, then the scanner will scan down in frequency from $f_1$ under the same conditions. During this scan, the detector will detect the Doppler shift frequencies associated with the nth and the $(n+1)$th altitude holes, $f_2$ and $f_3$ ($f_3$ is used in further calculations as will be seen below). After these frequencies have been detected, the stepped modulator is actuated to return the modulator to $\lambda_{m1}$ and the procedure starts again. The values $f_1, f_2, f_3, \lambda_{m1}$ and $\lambda_{m2}$ are fed to the computer as shown.

FIG. 4 illustrates an alternative system for obtaining the same quantities. In this system, the ratio $L$ is not preset, but the value for $f_2$ is preselected. As in the above case, precautions must be taken to ensure that $f_2$ is close enough to $f_1$ so that the modulating frequency at which a hole will occur at $f_2$, and which is closest to the first modulating frequency requires as many wavelengths between the aircraft and the ground as does the first modulating frequency. For this reason, $f_2$ filter and zero detector 7 may contain several filters, and frequency scanner 6 will select the filter closest to detected frequency $f_1$.

Up to the detection of $f_1$, the operation of this system is identical to the operation of the FIG. 3 system. When $f_1$ is detected, the scanner 6 selects the appropriate filter in $f_2$ filter 7. Simultaneously, it switches switching means 8 so that the output of the mixer 5 is routed to the filter 7, and actuates continuously variable modulator control 3A to continuously vary the modulating frequency of the modulator 1. As is well known in the art, if $f_2$ is greater than $f_1$, the modulator must be varied so that its frequency decreases and vice versa if $f_2$ is smaller than $f_1$. In this respect, comparator means 9, comparing $f_1$ and $f_2$, may be programmed to control the direction of modulator control 3. Alternatively, $f_2$ filter 7 may be programmed to automatically select a higher or lower frequency than $f_1$ so that the direction of 3A can be preset.

In any case, the modulating frequency is varied until a zero is detected at $f_2$. When the zero is detected, zero detector 7 switches 8 back to zero detector 6 and stops modulator control 3A at the frequency at which the zero occurred. The wavelength of this frequency is, of course, $\lambda_{m2}$. While the modulator continues to modulate the transmitter at the second frequency, frequency scanner 6 scans $f_d$ and detects the altitude hole at the Doppler shift frequency closest to and above $f_2$. This is $f_3$. When $f_3$ has been detected, zero detector 6 actuates modulator control 3A to return modulator 1 to the original modulating frequency, and the whole process starts again. As in FIG. 3, the values $f_1, f_2, f_3, \lambda_{m1}$ and $\lambda_{m2}$ are fed to the computer as shown.

Figure 5:
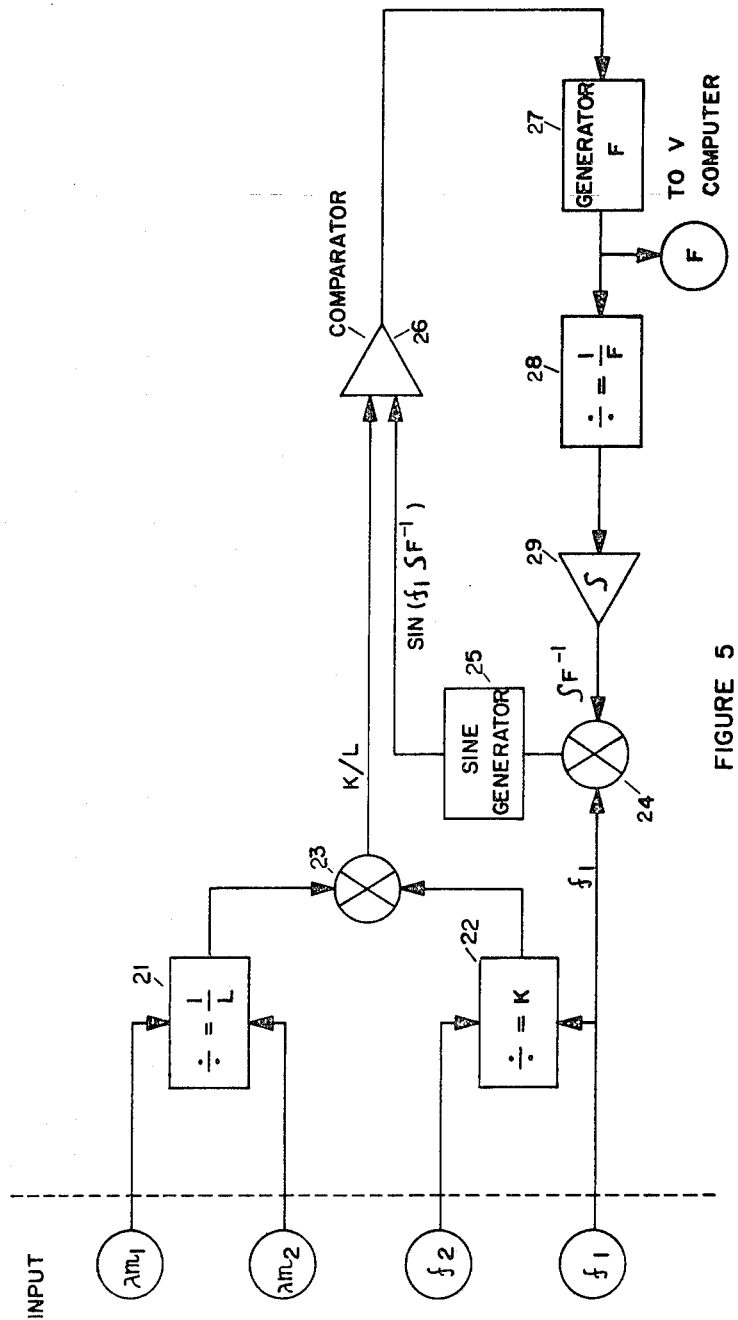

A computing mechanism for deriving the value F from the above inputs is illustrated schematically in FIG. 5. Inputs $\lambda_{m1}$, and $\lambda_{m2}$ are fed to divider 21 which produces $1/L$ at its output. Inputs $f_1$ and $f_2$ fed to divider 22 which produces $K$ at its output. $K$ and $1/L$ are fed to multiplier 23 whose output is $K/L$ Generator 27, which is controlled by the output of comparator 26, as will be explained below, generates a signal which, when the output of the comparator is zero, is representative of the value F. This value is inverted in divider 28 and $1/F$ is integrated in integrator 29. Multiplier 24 is fed at one input from the integrator and at the other input from input $f_1$ to provide an output $f_1 \int F^{-1}$ which is fed to the sine function generator which provides an output $\sin (f_1 \int F^{-1})$. Comparator 26 is fed at one input with the value $K/L$ and at the other input with the value $\sin (f_1 \int F^{-1})$. As can be seen in equation 4, when the output of the comparator is zero [$\sin (f_1 \int F^{-1}) = K/L$], the output of the generator 27 will be equal to $F$. Thus, comparator 26 will control generator 27 so as to reduce the output of the comparator to zero.

With $F$ and $\lambda c$ known, it is a simple matter to compute the aircraft velocity $V$.

In order to determine H, the aircraft height above ground, it will be recalled that $f_3$ is that altitude hole immediately above $f_2$ at a modulating frequency having a wavelength $\lambda_{m2}$. Thus, if the altitude hole detected by $f_2$ is the nth order altitude hole of wavelength $\lambda_{m2}$, then the altitude hole detected by $f_3$ is the $(n + 1)$th order altitude hole of wavelength $\lambda_{m2}$. With this in mind, and referring again to FIG. 2, it is noted that $\theta_2$ and $\theta_3$ can be determined once the value for $F$ is available as $f_3 = F/\sin \theta_3$ and
$f_2 = F/\sin \theta_2$
Also, $n\lambda_2 \cos\theta_2 = (n + 1) \lambda_2 \cos\theta_3$
so $n\lambda_{m2}\cos\theta_2 = (n + 1)\lambda_{m2}\cos\theta_3$
and $n = \cos\theta_3/\cos\theta_2 - \cos\theta_3$ \hfill (5)
now $H = n\lambda_2\cos\theta_2 = (n\lambda_{m2} \cos\theta_2)/2$
Thus $H = \cos\theta_3 \cos\theta_2 \lambda_{m2}/2(\cos\theta_2 - \cos\theta_3)$ \hfill (6)

Figure 6:
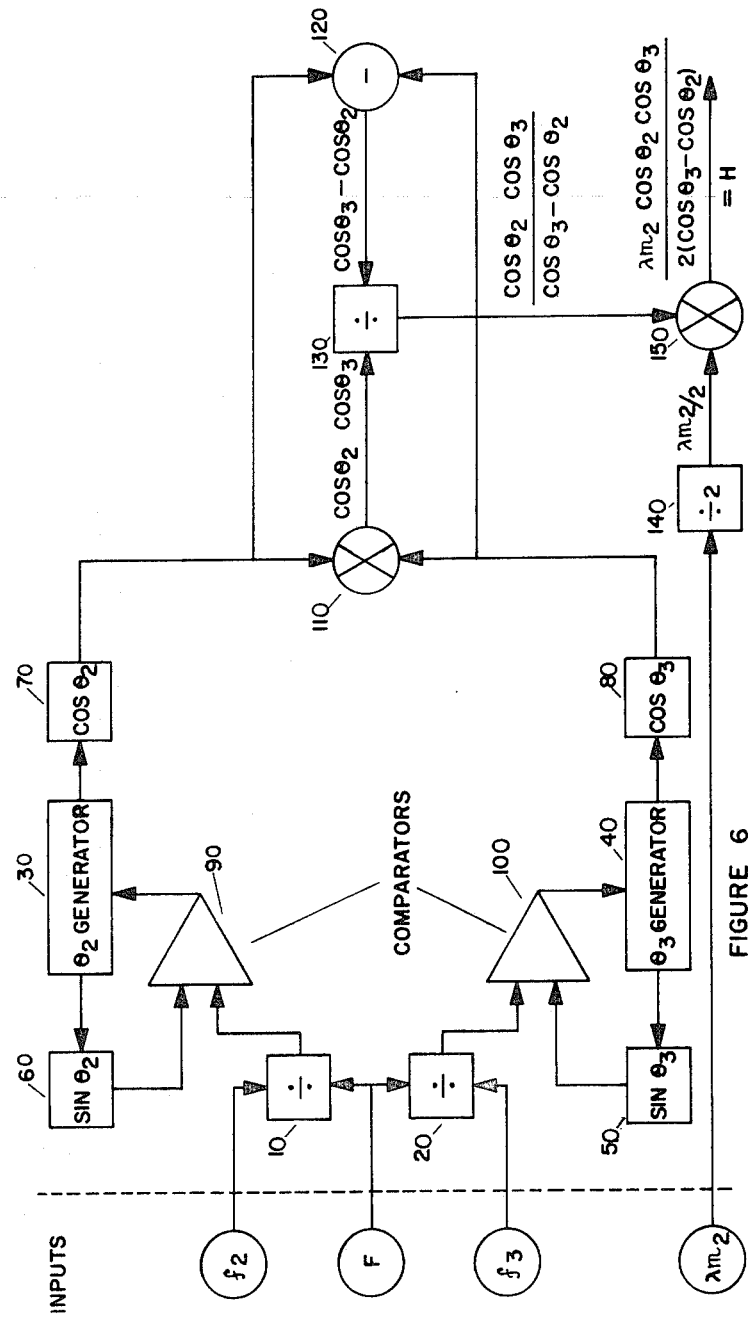

All of the information necessary for the solution of equation 5 is available, and FIG. 6 illustrates a computing circuit by means of which this equation may be solved. In FIG. 6, inputs $f_2$ and F are fed to divider 10. The output of this divider is, of course, $\sin\theta_2$ and this could be directly converted to $\cos\theta_2$ by well known means. However, in the preferred embodiment a $\theta_2$ generator is employed. The output of the generator is fed to sine converter 6, and the output of the converter is fed as one input to comparator 9, the other input of which is the output of divider 1. When the output of the comparator 9 is zero, then the value of the generator is representative of $\theta_2$, so that the comparator 9 will control the generator 3 in such a manner as to reduce the output of the comparator to zero. Cosine converter 7 converts $\theta_2$ to $\cos\theta_2$. In the same way, and using divider 2, comparator 10, generator 4, sine converter 5, cosine converter 8 and inputs $f_3$ and $F$, the value for $\cos\theta_3$ is derived. The outputs of the cosine converters are fed to multiplier 11, which provides at its output the value $\cos\theta_3\cos\theta_2$, and to subtractor 12, which provides at its output the value $\cos\theta_3 - \cos\theta_2$. The outputs of the multiplier 11 and subtractor 12 are fed as inputs to divider 13 whose output is $\cos\theta_3\cos\theta_2/\cos\theta_3 - \cos\theta_2$.

Input $\lambda_{m2}$ is fed to divide by two 14 whose output is fed as one input to multiplier 15. The other input to multiplier 15 is the output of divider 13 so that the output of the multiplier 15 is $\lambda_{m2} \cos\theta_3\cos\theta_2/2(\cos\theta_3 - \cos\theta_2)$. From equation 6, it is seen that this is equal to $H$.

At times, the ground slope cannot be neglected. In accordance with the invention, it is possible to solve for ground slope angle and at the same time, acquire enough information to determine V and H as well by establishing both the modulating wavelength of which some multiple is the local perpendicular, and also establishing the modulating wavelength of which some multiple is perpendicular to the aircraft. In order to understand how this is accomplished, reference is had to FIG. 7 in which $n\lambda_0$ is the perpendicular from the aircraft and $n\lambda_1$ is the local perpendicular. As in the above, $\lambda_0 = \lambda_{m0}/2$ and $\lambda_1 = \lambda_{m1}/2$. In this figure, $n\lambda_0\cos\theta_1 = n\lambda_1$.

Now
$f_1 = F \sin \theta_1$
So that
$f_1 = F [\sin (\cos^{-1} (n\lambda_1/n\lambda_0))]$
Let
$I = n\lambda_1/n\lambda_0 = 2n\lambda_{m1}/2n\lambda_{m0} = \lambda_{m1}/\lambda_{m0} = \cos \theta_1$
thus
$F = f_1/\sin(\cos^{-1} I) = f_1/\sqrt{(1 - I^2)}$ \hfill (7)

If $f_2$ is the Doppler shift associated with $n\lambda_2$, then
$f_2 = F \sin (\theta_1 + \theta_2)$
$f_2 = F \sin \theta_2 \cos\theta_1 + F \cos\theta_2 \sin\theta_1$ $$= \frac{f_1}{\sqrt{1-I^2}} (I \sin \theta_2 + \sqrt{1-I^2} \cos \theta_2) \quad (8)$$

Let
$K = \cos\theta_2 = n\lambda_1/n\lambda_2 = \lambda_{m1}/\lambda_{m2}$ \hfill (9)
So
$\sin\theta_2 = \sqrt{1 - K^2}$ \hfill (10)

Substituting 9 and 10 in 8, $$f_2 = \left(\frac{f_1}{\sqrt{1-I^2}}\right)(I\sqrt{1-K^2} + K\sqrt{1-I^2})$$

Simplifying:

$$f_2 = f_1\left[\left\{\frac{(\sqrt{1-K^2})}{\sqrt{1-I^2}}I\right\} + K\right] \quad (11)$$

Equation 11 holds only when $n\lambda_1$ is perpendicular to ground. Thus, an iterative procedure in which $\lambda_{m1}$ is changed until equation 11 holds, can be used to solve for $I$.

As is well known, the Doppler shift frequency in a direction perpendicular to the direction of motion is zero. Thus, in order to determine $\lambda_{mo}$, it is only necessary to lock a filter onto zero Doppler shift frequency (which is not necessarily equal to zero frequency, e.g. if double modulation is employed, then zero Doppler shift frequency would be equal to the pedestal frequency) and vary the modulation frequency until a hole appears at zero Doppler shift frequency. This modulation frequency has a wavelength $\lambda_{mo}$. The modulating frequency is then increased so that it now has a wavelength $\lambda_{m1}$ less than $\lambda_{mo}$. Again, caution must be exercised in the selection of $\lambda_{m1}$ to ensure that the altitude hole detected by the Doppler shift frequency closest to zero Doppler shift frequency is the same order altitude hole as is the order of altitude hole at zero Doppler shift frequency. The Doppler shift frequency immediately above zero Doppler shift frequency which is detected when $\lambda_{m1}$ is employed is $f_1$.

Exercising the same caution as was exercised in the choice of $\lambda_{m1}$ a third modulating frequency having a wavelength $\lambda_{m2}$ is selected and the frequency of the altitude hole directly above $f_1$ is detected. This Doppler shift frequency is $f_2$.

With the data thus obtained, there is enough information to compute a value for the right hand side of equation 11. This value is then compared with $f_2$. If they are not equal, a new value is selected for $\lambda_{m1}$ and $\lambda_{m2}$ and the procedure is repeated until values are selected at which the right hand side and the left hand side of equation 11 are equal. When the left hand side is equal to the right hand side, then $n\lambda_1$ is the length of the perpendicular and $\theta_1$ is equal to $\psi$ the ground slope angle. As $I = \cos\theta_1$, $\theta_1$ can be determined when the iteration is complete.

To determine $F$, and thereby $V$, use is made of equation 7. To solve for $H$, it would only be necessary to obtain the $(n+1)$th order altitude hole of $\lambda_{m2}$ and to use equation 5 supra and the circuit of FIG. 6.

Equation 11 can be greatly simplified by letting $I=K$. Under these conditions, equation 11 reduces to
$F_2 = 2If_1$ \hfill (12)

When this equation is employed, the procedure for determining $\psi$ is identical to that described above up to the detection of $f_1$. However, at this point, instead of stepping the modulating frequency, the frequency $f_2$, as determined by equation 12, is monitored and the modulating frequency is continuously varied until a hole appears at $f_2$. The modulating frequency at which a hole appears has a wavelength $\lambda_{m2}$. To determine whether $\lambda_{m1}$ was correctly chosen, $I$ is compared with $K$ (both ratios are defined as in the above method). If they are not equal, a new $\lambda_{m1}$ is chosen, and this procedure is repeated until $I$ equals $K$. As in the previous method, the data to determine $\psi$, $F$, $V$ and $H$ is now available.

A circuit for implementing either of the above methods, by appropriate programming of the various elements, is illustrated in FIG. 8. The circuit would be identical, after the modulator and before the receiver, to that shown in FIGS. 3 and 4. Additional units are the computer 11 and the control unit 12. 7B is a variable filter and zero detector unit and modulator control 3B is adaptable to either step the modulating frequency or to vary it continuously.

Considering the first method, the variable filter would be set only at zero Doppler shift frequency. (DC for single modulation and the pedestal frequency for double modulation). On starting, the control unit 12 would order the modulator control to vary the modulating frequency continuously. When a zero is detected at zero Doppler shift frequency, a signal is sent to the control unit 21, which stops the modulator control 3B and commands it to tell the computer what frequency it stopped at. This is the frequency having a wavelength $\lambda_{mo}$. The computer, using this information, computes a value for $\lambda_{m1}$ and informs the control unit 12 what the computed value is. The control unit accordingly sets the modulator control to this value.

At the same time that the zero detector 7B informs the control unit 12 that it has detected a zero, it switches switch 8 so that the mixer 5 is now connected to the frequency scanner and zero detector 6. The detector 6 detects the hole at the first Doppler shift frequency above the zero Doppler shift frequency. When this zero is detected, the computer is informed of this fact as well as the value of the detected $f_1$. The computer computes a value for $\lambda_{m2}$ and informs the control unit 12 what this value is, and the control unit sets the modulator control to this value. $f_2$, the Doppler shift frequency next greater than $f_1$ at which a hole appears when $\lambda_{m2}$ is used, is then detected, and the computer is so informed and also given the value for $f_2$. The computer then checks the left hand side of equation 11 against its right hand side. If they do not agree, it selects a new value for $\lambda_{m1}$, and the steps for determining $f_1$, $f_2$, $\lambda_{m1}$ and $\lambda_{m2}$ are repeated. This procedure is then continued until both sides of the equation are equal. When this state is reached, the computer so informs the control unit 12 which then switches switch 8 so that 5 is once again connected to 7B, and at the same time commands the modulator control 3B to start varying continuously again. The computer will, of course, be programmed to change $\lambda_{m1}$ in such a direction as to cause both sides of equation 11 to be equal.

The operation of the circuit for method 2 is identical up to the detection of $f_1$. At this point, however, the computer calculates $f_2$ in accordance with equation 12. It informs the control unit 12 what this value is, and the control unit then returns switch 8 to filter 7B and sets the value of the filter to $f_2$. At the same time, it commands the modulator control 3B to start varying continuously. When a zero is detected at $f_2$, the modulator control sends the value of $\lambda_{m2}$ to the computer. The computer now checks to see if $I$ is equal to $K$, and keeps changing $\lambda_{m1}$ until such time as $I$ will equal $K$. At this point, the iteration commences again from the beginning.

It is, of course, clear, that the circuit would usually be adapted to detect the $(n+1)$th order hole of $\lambda_{m1}$ or $\lambda_{m2}$ for the determination of height, and that the computer would be adapted to calculate $F$, $V$ and $H$ from the data collected.

A computer for calculating $I$ and $K$ and for comparing both sides of equation 11 is illustrated schematically in FIG. 9. The operation of this system is self-evident and requires no further explanation. A computer for calculating $I$ and $K$ and comparing their values is illustrated schematically in FIG. 10. The operation of this system is also self evident and requires no further explanation.

In order to measure drift angle, two antennas at a fixed angle to each other, or one antenna with two beams at a fixed angle to each other, as is well known in the art, would be used.

Although several embodiments have been described in the foregoing, it is understood that this was for the purpose of illustrating, but not limiting, the invention. Various modifications which will come readily to the mind of one skilled in the art are considered to be within the scope of the invention.

I claim:

1. An FM/CW Doppler aircraft navigation system comprising; an antenna for radiating a beam of radio energy and for receiving Doppler shifted echo returns of said radiated energy; a transmitter for energizing said antenna; a modulator for frequency modulating said transmitter; whereby said transmitter will provide a frequency modulated signal at its output; a modulator control means for varying the frequency of said modulator; a receiver connected to said antenna; a mixer and filter means having two inputs and one output; one of said inputs being connected to said transmitter to receive unshifted frequency modulated signals therefrom; the other of said inputs being connected to said receiver to receive Doppler shifted echo returns therefrom; the output of said mixer and filter means providing a frequency spectrum in the range of said Doppler shift frequencies, the amplitude of said spectrum falling to substantially zero at Doppler frequencies associated with multiples of the half wavelength of said modulating frequency; and means for scanning said frequency spectrum and detecting said Doppler shift frequencies at said amplitude zeros.

2. An FM/CW Doppler aircraft navigation system as defined in claim 1 wherein said beam of radio energy comprises at least one narrow width fan shaped beam.

3. An FM/CW Doppler aircraft navigation system as defined in claim 2 wherein said frequency scanning and zero detecting means is adapted to detect a first Doppler shift frequency at an amplitude zero associated with an $n$th multiple of the half wavelength of said modulating frequency; and further comprising means for determining a second Doppler shift frequency of an amplitude zero associated with the nth multiple of a second modulating frequency; said first and second modulating frequencies being so related that no amplitude zeros will fall between said first and said second Doppler shift frequencies.

4. An FM/CW Doppler aircraft navigation system as defined in claim 3 wherein said modulator control means comprises means for stepping the frequency of said modulator means such that said first and said second modulating frequencies bear a fixed, predetermined ratio with one another; the output of said mixer and filter means being connected to the input of said frequency scanning and zero detecting means; one output of said frequency scanning and zero detecting means being connected to said modulator control means; whereby, when said frequency scanning and zero detecting means detects said first Doppler shift frequency at said first modulating frequency, a first signal is sent from said frequency scanning and zero detecting means to said modulator control means to cause said modulator control means to step the frequency of said modulator means to said second modulating frequency; said frequency scanning and zero detecting means being further adapted to detect said second Doppler shift frequency; said frequency scanning and zero detecting means being still further adapted to detect a third Doppler shift frequency, immediately adjacent said second Doppler shift frequency, at an amplitude zero associated with the ($n+1$)th multiple of the half wavelength of said second modulating frequency; said frequency scanning and zero detecting means providing a second signal to said modulator control means when said third Doppler shift frequency is detected to cause said modulator control means to return said modulator to said first modulating frequency.

5. An FM/CW Doppler aircraft navigation system as defined in claim 3 wherein said modulator control means comprises means for varying the frequency of said modulator continuously; and further comprising means for preselecting said second Doppler shift frequency, said means comprising a second Doppler shift frequency filter and zero detecting means; and still further comprising a two position switch means, said switch means being adapted, in one position thereof, to connect the output of said mixer and filter means to said frequency scanning and zero detecting means, and, in the other position thereof, to said second Doppler shift frequency filter and zero detecting means; said switch being in said first position when said modulator is at said first modulating frequency; said frequency scanning and zero detecting means, and said second Doppler shift frequency filter and zero detecting means each being connected to said modulator control means and said switch means; said frequency scanning and zero detecting means being still further adapted to detect a third Doppler shift frequency, immediately adjacent said second Doppler shift frequency, at an amplitude zero associated with the ($n+1$)th multiple of the half wave length of said second modulating frequency; whereby, when said first Doppler shift frequency is detected by said frequency scanning and detecting means, a first signal is provided to said modulator control means to cause it to begin varying said modulator frequency continuously, and a second signal is provided to said switch means to cause it to acquire said second position; and wherein said second modulating frequency comprises that modulating frequency at which an amplitude zero is detected by said second Doppler shift frequency filter and zero detector means; and whereby, when said second Doppler shift frequency is detected by said second Doppler shift frequency filter and zero detector, a third signal is provided to said modulator means to cause it to remain at said second modulating frequency, and a fourth signal is provided to said switch means to cause it to acquire said first position; and whereby, when said third Doppler shift frequency is detected by said frequency scanning and zero detecting means, a fifth signal is provided to said modulator control means to cause it to return said modulator to said first modulating frequency.

6. An FM/CW Doppler aircraft navigation system as defined in claim 2 and further comprising; a variable filter and zero detecting means, said filter being in the range of said frequency spectrum and including zero Doppler frequency shift; a control unit; a switch means being adapted, in one position thereof, to connect said mixer and filter means to said variable filter and zero detecting means, and in the other position thereof, to connect said mixer and filter means to said frequency scanning and zero detecting means; said control unit being programmed to control said modulator control means and said switch means; a computer means receiving data from said modulator control means and from said frequency scanning and zero detecting means and providing information to said control means; whereby, at the start of an operating cycle, said control means causes said switch to be in said one position, and further causes said variable filter means to be positioned at zero Doppler shift frequency, and still further causes said modulator control means to vary said modulating frequency continuously until said variable filter and zero detecting means detects an amplitude zero at zero Doppler shift frequency associated with an $n$th multiple of the half wavelength of a first modulating frequency; a value representative of said first modulating frequency being fed to said computer means; said control means causing said modulator control means to step the modulating frequency to a second modulating frequency, determined by said computer means, and causing said switch means to acquire its other position, when said zero Doppler shift frequency is detected; said frequency scanning and zero detecting means being adapted to scan upwards in frequency from said zero Doppler shift frequency and to detect a first Doppler shift frequency, said first Doppler shift frequency being the Doppler shift frequency next adjacent said zero Doppler shift frequency at which a zero amplitude appears, and which is associated with the $n$th multiple of said second modulating frequency; a value representative of said first Doppler shift frequency being fed to said computer means.

* * * * *